Patented June 17, 1941

2,246,020

UNITED STATES PATENT OFFICE 2,246,020

TREATMENT OF STYRENE WITH COPPER

Sylvia M. Stoesser, Midland, and Orville A. Braley, Albion, Mich., assignors to The Dow Chemical Company, Midland, Mich., a corporation of Michigan No Drawing. Application October 1, 1938, Serial No. 232,800

7 Claims. (Cl. 260—41)

The present invention relates to the treatment of vinyl aromatic compounds, particularly styrene, with metallic copper and to the products so obtained.

It is reported in a co-pending application by one of us (Serial No. 104,060, filed October 5, 1936) that a number of metals and metal compounds inhibit the polymerization of monomeric styrene. It is also noted that such substances are decidedly superior to the organic stabilizing agents known in the prior art in that the new metal inhibitors are easily removable from the styrene. As a continuation of these findings, we have now discovered that metallic copper exhibits a number of unique properties which make it a particularly valuable material for the treatment of styrene both as an inhibitor, and as a coloring agent.

When monomeric styrene is contacted with metallic copper or a copper alloy for several days at room temperature, it is found that the styrene has been stabilized to a considerable extent against polymerization. The inhibitor formed in the styrene by such exposure to the copper is especially useful in that it is effective at ordinary temperatures, but is practically without stabilizing action at temperatures above 80° C. Accordingly, styrene which has been contacted with metallic copper may be safely stored at room temperatures and yet may also be polymerized at elevated temperatures by ordinary procedures without any necessity of removing the inhibitor. This extreme simplicity of technique attainable with the copper-formed inhibitor is of considerable importance to the consumer.

The nature of the inhibiting agent formed in monomeric styrene during exposure to metallic copper is not definitely known, but it is believed to be colloidally suspended copper. The concentration of copper in the styrene increases as the time which the liquid is exposed to the metal lengthens. That is, although the inhibiting effect of the copper-formed inhibitor is observable after a very short time of contact of copper and styrene, the metal and liquid may stand in contact with one another for at least a week before the concentration of the copper becomes sufficient to color the styrene a light green. The unusual efficacy of the copper-formed inhibitor is indicated by the fact that styrene which contains copper in quantity insufficient to cause a green coloration is still stabilized against polymerization at room temperature.

As hereinbefore explained, the inhibitor body formed in monomeric styrene which has been exposed to metallic copper for several days is not effective at elevated temperatures and the styrene may readily be polymerized by heating to temperatures above 80° C. When such polymerization is carried out, the product obtained has an attractive appearance, being slightly pearlescent and having a soft rose color by reflected light, but a pale blue color by transmitted light. The product may be fabricated, by the methods usually employed with polystyrene, into novelties and other decorative objects in which the interplay of the rose and blue colors is very pleasing.

The source of coloration in the polymerized styrene is not fully understood. It is supposed that during polymerization the copper colloidally suspended or otherwise contained in the monomeric styrene undergoes some pronounced physical change, possibly a change in particle size, which results in formation in the polystyrene of a colloidal dispersion of metallic copper which dispersion exhibits the rose and blue coloration described. The color is, so to speak, developed during polymerization of the styrene and is brought out pronouncedly even from styrene containing copper in so little quantity that the monomeric styrene has no observable color.

In preparing colored polystyrene according to the invention, it is not necessary that the monomer be stored in contact with metallic copper for a considerable period at room temperature and then polymerized to develop the color. The same result may be obtained by contacting the styrene with metallic copper for a short time, e. g., an hour or two, at temperatures above 80° C. and then developing the color by polymerization, preferably in a copper container. Our new colored polystyrene may also be obtained from monomeric styrene which has been contacted with alloys rich in copper, such as brass and bronze. However, the ability to form the rose-blue colors in polystyrene seems to be limited to copper in the metallic state since we have been unable to obtain the coloration by contacting monomeric styrene with salts of copper or with other metals, and then polymerizing the styrene.

In certain instances it may be desired to utilize the inhibiting action of metallic copper to stabilize monomeric styrene during storage and shipment; at the same time a colorless polymer may be wanted. In these cases it becomes necessary to remove the copper inhibitor from the monomeric styrene before polymerization. We have found that this removal may be effected merely by treating the monomeric styrene with charcoal, preferably finely divided activated charcoal, and then filtering to remove the charcoal. Alternatively, the monomeric styrene may be allowed to percolate one or more times through a bed of charcoal. After such treatment the styrene can be polymerized in any of the usual ways to obtain a colorless resin of great clarity.

To summarize, then, we have found that styrene may be stabilized against polymerization at room temperatures by contact with metallic copper and may then be polymerized at elevated temperatures without the necessity of removing the inhibiting agent. The polymer obtained is of a pleasing colored appearance. Other methods of producing the same colored polymer have been described. In addition, it has been shown that the copper inhibitor may, if desired, be removed before polymerization by treating the monomeric styrene with charcoal.

For the sake of simplicity, the foregoing discussion has been limited to styrene. It is to be understood, however, that our invention is equally applicable to other vinyl aromatic compounds, e. g. ethyl styrene, p-chloro-styrene, divinyl benzene, etc.

It will be appreciated that our invention is not limited precisely to the procedures and compositions hereinbefore disclosed, but is co-extensive in scope with the following claims.

We claim:

1. The method which comprises contacting an aromatic vinyl compound with a metal selected from the class consisting of copper and alloys essentially comprising copper and thereafter polymerizing said compound by heating at a temperature above 80° C. whereby a colored polymer is obtained.

2. The method which comprises contacting monomeric styrene with a metal selected from the class consisting of copper and alloys essentially comprising copper and thereafter polymerizing the styrene by heating at a temperature above 80° C. whereby a colored polymer is obtained.

3. The method which comprises contacting monomeric styrene with a metal selected from the class consisting of copper and alloys essentially comprising copper at ordinary temperatures for several days and thereafter polymerizing the styrene by heating at a temperature above 80° C. whereby a colored polymer is obtained.

4. The method of preparing a colored object from an aromatic vinyl compound which comprises contacting the compound with a metal selected from the class consisting of copper and alloys essentially comprising copper, polymerizing the resulting material by heating at a temperature above 80° C., and forming the resulting polymer into an object.

5. A process according to claim 4 wherein the aromatic vinyl compound is styrene.

6. A colored polymerized vinyl aromatic compound prepared according to the process of claim 1.

7. Colored polymerized styrene prepared according to the process of claim 2.

SYLVIA M. STOESSER.
ORVILLE A. BRALEY.